(12) United States Patent
Cascio

(10) Patent No.: US 6,204,589 B1
(45) Date of Patent: Mar. 20, 2001

(54) STRAIN-MATCHED HUB FOR MOTOR/ GENERATOR

(75) Inventor: Michael C. Cascio, Medfield, MA (US)

(73) Assignee: Acumentrics Corporation, Westwood, MA (US)

(*) Notice: Subject to any disclaimer, the term of this patent is extended or adjusted under 35 U.S.C. 154(b) by 0 days.

(21) Appl. No.: 09/436,279

(22) Filed: Nov. 8, 1999

(51) Int. Cl.$^7$ ..................................................... H02K 1/30

(52) U.S. Cl. ........................ 310/261; 310/262; 310/273; 310/74; 310/156; 74/572

(58) Field of Search ............................... 310/261, 262, 310/74, 273, 156; 74/572, 574

(56) References Cited

U.S. PATENT DOCUMENTS

| | | | |
|---|---|---|---|
| 3,602,066 | 8/1971 | Wetherbee | 74/572 |
| 3,683,216 | 8/1972 | Post | 310/67 |
| 4,058,024 | 11/1977 | Gordon | 74/572 |
| 4,182,138 | 1/1980 | McGuire | 64/11 |
| 4,428,713 | 1/1984 | Coplin et al. | 415/48 |
| 4,481,840 | * 11/1984 | Friedericy et al. | 74/572 |
| 4,636,675 | * 1/1987 | Takahashi | 310/157 |
| 4,860,611 | 8/1989 | Flanagan et al. | 74/572 |
| 4,864,175 | * 9/1989 | Rossi | 310/156 |
| 4,879,793 | 11/1989 | Stuecker et al. | 29/156.8 |
| 5,344,895 | 9/1994 | Lai et al. | 525/425 |
| 5,705,902 | 1/1998 | Merritt et al. | 318/254 |
| 5,717,263 | 2/1998 | Cox | 310/74 |
| 5,732,603 | * 3/1998 | Swett et al. | 74/572 |
| 5,760,506 | 6/1998 | Ahlstrom et al. | 310/74 |
| 5,912,519 | 6/1999 | Horner et al. | 310/74 |
| 5,962,941 | 10/1999 | Serdar, Jr. et al. | 310/153 |
| 6,014,911 | * 1/2000 | Swett | 74/572 |

FOREIGN PATENT DOCUMENTS 97-142-7 * 4/1997 (WO) .............................. H02K/1/30

OTHER PUBLICATIONS www.amocochemicals.com/pdf/imtrus.htm "Typical Properties, Torlon Polyamide–imide" (2 pages).
www.cadillacplastic.com/BuyersGuide/engineer/torlon53.htm "Torlon ®" (2 pages).
www.dsmsheffield.com/products/namerica/torlonnamerica.html "DSM Engineering Plastic Products, Torlon ® PA1" (4 pages).
www.magma.ca/~fesi/Home/Home.html "Flywheel Energy Systems Inc.–Home" (1 page).
www.magma.ca/~fesi/Products/Products.html Flywheel Energy Systems Inc.–Products (4 pages).
www.portplastics.com/fzen3aMb/plastics/highperform/torlon–457.html "Port Plastics—Torlon* 4347, 5030, 7130" (1 page).

* cited by examiner

Primary Examiner—Burton Mullins
(74) Attorney, Agent, or Firm—Bromberg & Sunstein LLP

(57) ABSTRACT

A strain-matched hub for a motor/generator. The motor/generator preferably includes a cylindrical rotor surrounding a stator, and of larger diameter than a shaft. The hub, formed of a single material, connects the shaft to the rotor assembly, and contains a fastener circle whose expansion is matched to the rotor's expansion, in operation. Like the rotor, the hub's fastener circle expands uniformly around the fastener circle's circumference.

Typically, a ring of keystone-shaped metal elements fits the hub to the rotor. The hub attaches to the keystone-shaped elements with a plurality of bolts or other fasteners, and the keystone-shaped elements fit to the rotor. The hub is formed of a single material and contains a plurality of spokes, each spoke positioned along a radius from the center of the hub to the center of a bolt. Each spoke is shaped to fit between two pairs of tangent-joined circles. For each pair of circles, the center of the circle that is formed in part by the inner curve of the hub rim is located radially outside the center of the circle that is formed by the outer curve of the hub's center region.

17 Claims, 12 Drawing Sheets

STRAIN-MATCHED HUB FOR MOTOR/ GENERATOR

TECHNICAL FIELD

This invention relates to systems and methods for reducing mechanical strain in electric motors and generators.

BACKGROUND OF THE INVENTION

U.S. Pat. No. 5,705,902 of Merritt et al. discloses a DC motor/generator based on a Halbach array of permanent magnets. This motor/generator is "inside-out" when compared with a conventional motor/generator: its rotor is on the outside of the machine, and its stator is on the inside. An array of permanent magnets rotates along with the rotor.

This geometry creates new mechanical challenges. When the rotor operates, it expands radially. The permanent magnets increase the centrifugal expansion by adding parasitic mass to the inner surface of the rotor. Large degrees of radial expansion threaten to pull the rotor away from other components of the motor/generator, thereby causing mechanical failure.

U.S. Pat. No. 4,860,611 of Flanagan et al. discloses a flexible rim hub for an energy storage rotor. Flanagan's metal hub is designed for use within the rotor itself. A tight interference fit within the rotor inhibits easy removal of the hub during maintenance. Flanagan's metal hub design is not a suitable mechanical attachment outside the axial length of the rotor. The hub lacks a surface through which bolts might be used to attach the hub to an outer axial end of a rotor. Moreover, because outer rim sections of Flanagan's hub between the spokes would expand more than rim sections at the end of spokes, the hub would be prone to failure if not surrounded by the rotor. Therefore, such a hub cannot be mounted outside the axial length of the rotor because, with its rim unenclosed by the rotor, it expands unevenly around its circumference and could break apart.

There is a need for hubs that reduce mechanical strain in motor/generators, while also being easily accessible for maintenance.

SUMMARY OF THE INVENTION

Embodiments of the invention are directed toward providing a strain-matched hub for a motor/generator.

The motor/generator preferably includes a cylindrical rotor surrounding a stator, and of larger diameter than a shaft. The hub, formed of a single material, connects the shaft to the rotor assembly, and contains a fastener circle whose expansion is matched to the rotor's expansion, in operation. Like the rotor, the hub's fastener circle expands uniformly around the fastener circle's circumference.

In a preferred embodiment, the system includes a Halbach array motor/generator, in which an array of permanent magnets on the rotor provide a uniform dipole field, and the stator lies along the axis of the dipole field.

Preferably, a ring of keystone-shaped metal elements fits the hub to the rotor. The hub attaches to the keystone-shaped elements with a plurality of bolts or other fasteners, and the keystone-shaped elements fit to the rotor. The hub is formed of a single material and contains a plurality of spokes, each spoke positioned along a radius from the center of the hub to the center of a bolt. Each spoke is shaped to fit between two pairs of tangent-joined circles. For each pair of circles, the center of the circle that forms the inner curve of the hub rim is located radially outside the center of the circle that forms the outer curve of the hub's center region.

In a preferred embodiment, the hub is made of plastic; in particular, the hub may be made of the polyamideimide plastic known at the time of filing as Torlon®.

DESCRIPTION OF SPECIFIC EMBODIMENTS

Figure 1:
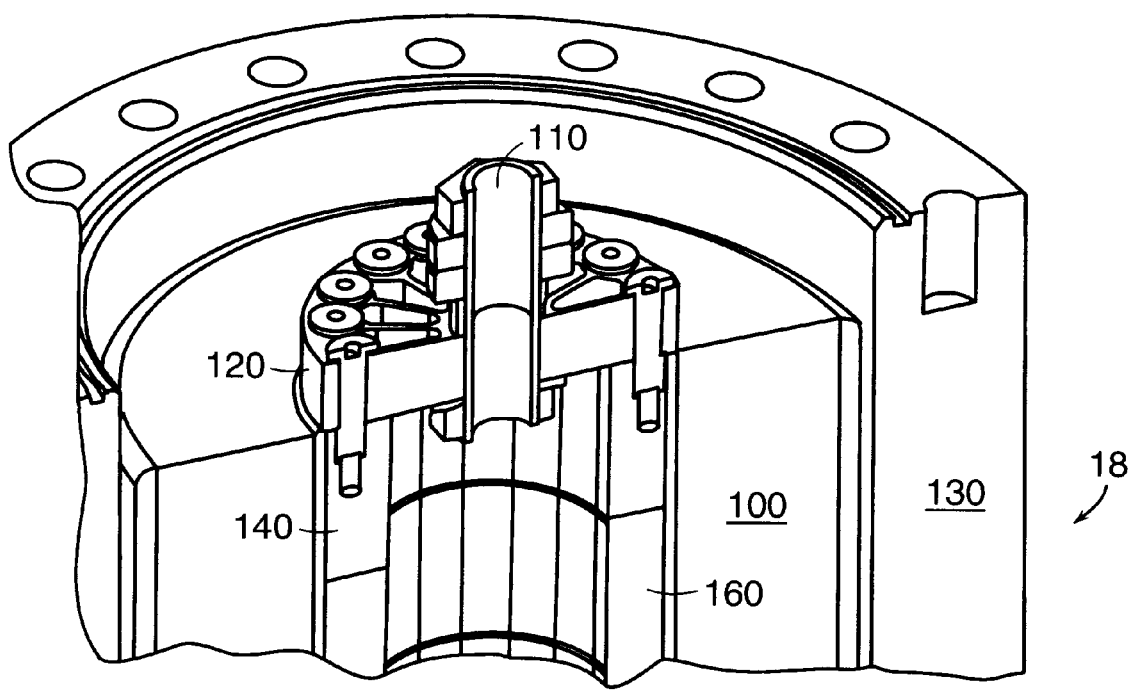
FIG. 1 shows a cross-sectional isometric view of an electric machine according to an embodiment of the present invention.

FIG. 1 shows a cross-sectional isometric view of an electric machine according to an embodiment of the present invention.

The system uses many of the components and features described in above referenced U.S. Pat. No. 5,705,902, issued Jan. 6, 1998 to Merritt et al. This patent is hereby incorporated herein by reference.

In system 18 of FIG. 1, cylindrical rotor 100 stores mechanical energy, spinning along with shaft 110 and hub 120. Keystone pieces 140, made of metal or another suitable material, and permanent magnets 160 fit inside rotor 100 with a tight interference fit. Thus keystone pieces 140, permanent magnets 160, and rotor 100 form the major components of the rotor assembly, in a preferred embodiment; however, a hub according to embodiments of the invention may be used with other rotor assemblies. Permanent magnets 160 form a Halbach array, which provides a uniform dipole field along the axis of rotor 100. A stator lies along the axis of the dipole field, and an electric commutator provides current to windings on the stator. System 18 therefore functions as a motor/generator: current provided through the commutator causes rotor 100 to rotate, or the mechanical energy of rotor 100 is converted to electrical energy in the windings of the stator.

Figure 2:
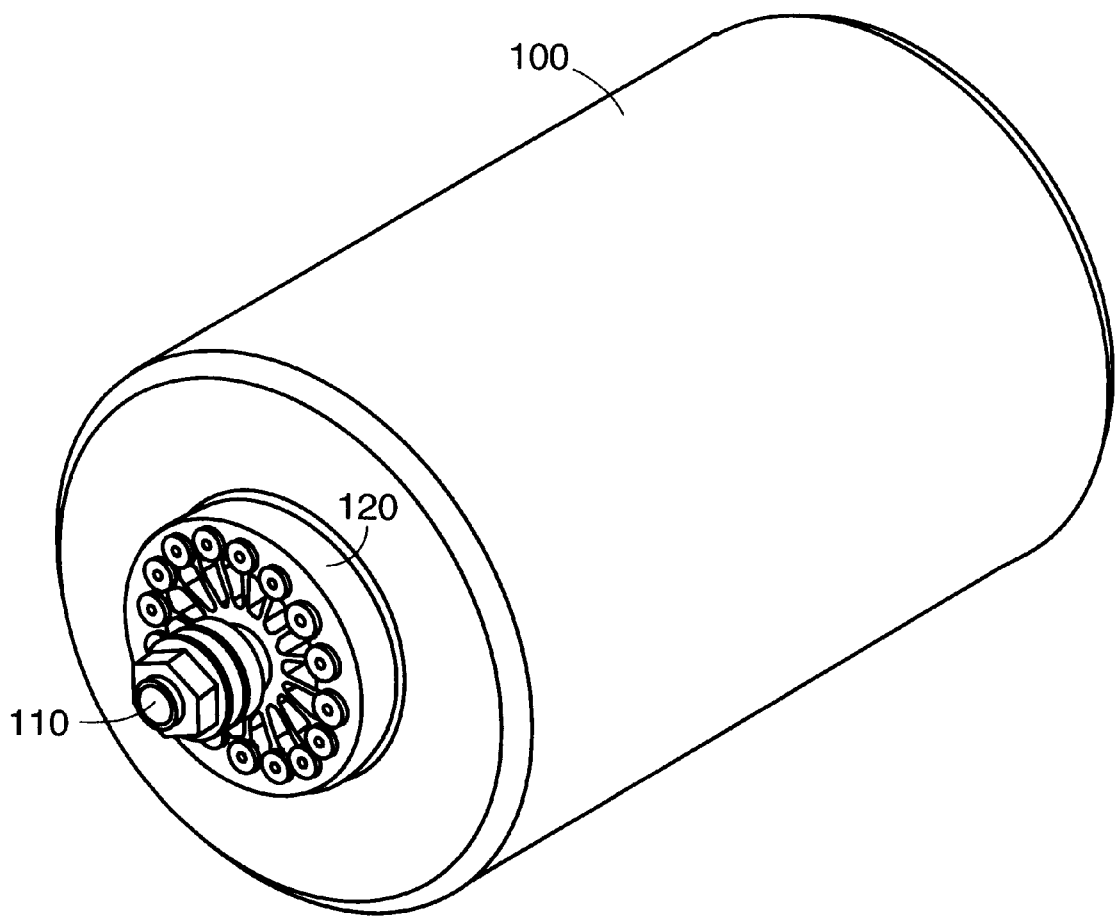
FIG. 2 shows an exterior isometric view of a rotor, hub, and shaft according to the embodiment of FIG. 1.

Containment 130 protects the rotor from its environment. FIG. 2 shows rotor 100, hub 120 and shaft 110 without the surrounding containment.

The speed of the rotor of system 18 may vary within a range of speeds, including high speeds above 10,000 rpm. The rotor of system 18 may, in one actual embodiment, spin as fast as 44,827 rpm, storing 3 MJ of energy.

Spinning the rotor of system 18 at high speed thus allows the storage and retrieval of large amounts of energy. However, at high speeds, rotating objects like hub 120 and rotor 100 expand radially. Parts of the objects at larger radii from the center of rotation expand to a greater extent than parts at smaller radii. Permanent magnets 160 increase the rotor's radial expansion by adding parasitic mass to the inner surface of the rotor.

The difference between rotor 100's expansion and shaft 110's expansion threatens to pull apart any hub that connects the rotor assembly to shaft 110, causing system 18 to fail.

Figure 3B:
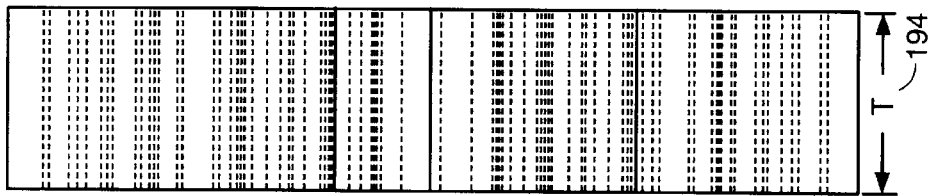
FIGS. 3A and 3B show the face and edge of a hub according to the embodiment of FIG. 1.
Figure 3A:
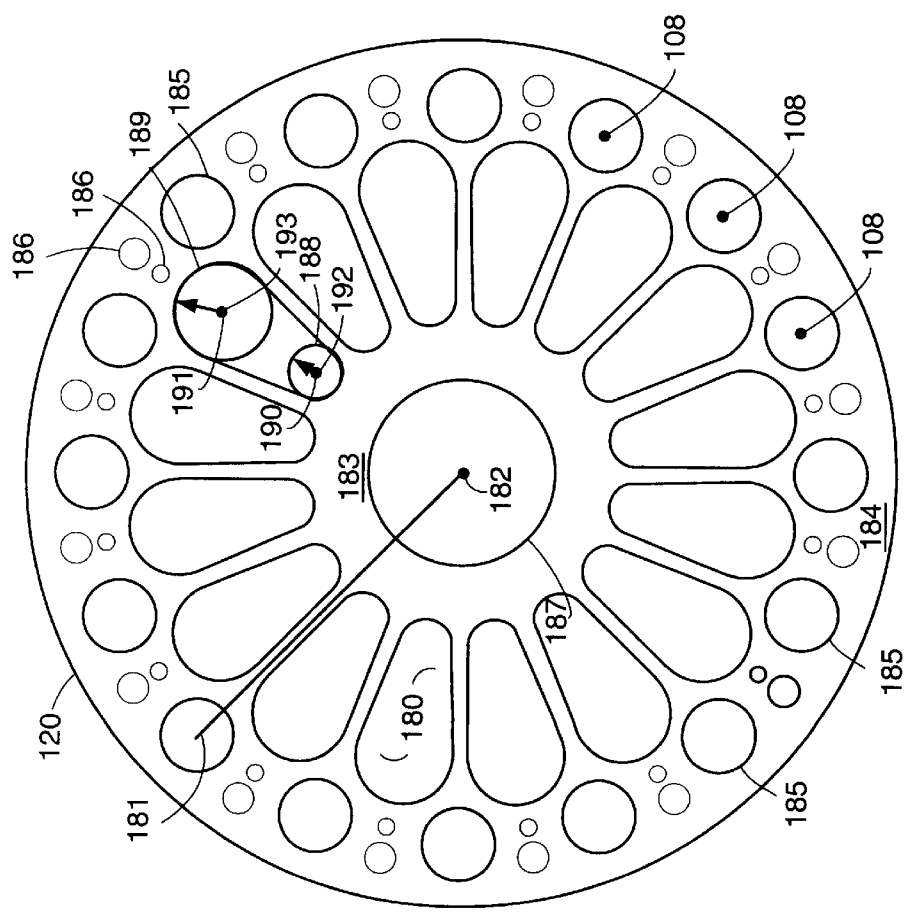

However, hub 120, shown in further detail in FIGS. 3A and 3B, meets the need of connecting the rotor assembly to shaft 110, without pulling apart at high speeds, and allows the hub to be easily accessible by being fastened outside the axial length of the rotor. Fastener holes 185 are formed in hub rim 184. An imaginary circle through the fastener holes 185 is referred to as the fastener circle. Spokes 180 are specially formed to stretch at high speeds, so that the fastener circle is able to expand in a way that is matched to the expansion of the rotor, at the same time that hub center region 183 expands to a lesser degree.

Spokes 180 are formed into their particularly advantageous shape by cutting out from a circular hub an array of spoke-holes, each made of a pair tangent-joined circles 188 and 189. The radially outer portions of circle 189's perimeter form the inner edge of hub rim 184, while the radially inner portions of circle 188's perimeter form the outer edge of hub center region 183. In order to make spokes 180 stretch in an advantageous fashion, center 193 of circle 189 is located radially outside center 192 of circle 188. Radius 191 of circle 189 is larger than radius 190 of circle 188. Each spoke 180 lies along a radius 181 from the hub center 182. The hub also has a large central hole 187, through which it is attached to a shaft.

Forming hub 120 in this fashion produces spokes 180 that stretch to the same degree as the rotor, thus matching the fastener circle's expansion to the rotor's. Because of this match, hub 120 need not be fitted within the rotor. Instead, it can be bolted onto the end of the system, through fastener holes 185. Hub 120 can be fastened to the rest of the system with fasteners other than bolts, too, and fastener holes 185 may be openings for other kinds of fasteners. For example, the fasteners may be screws, nail-like fasteners, rivets, fasteners inserted into a slot, cylindrical fasteners, or other fasteners known to those of skill in the art.

Preferably, small stress-relief holes 186 are included, to further relieve stress around fastener holes 185.

Hub 120 may be made of uniform thickness T, shown as reference numeral 194 in FIG. 3B, because of its spokes' 180 ability to stretch. Without the need to thin the hub near its outer circumference, as is sometimes done with rotating discs, the hub is sturdier, easier to manufacture, and can more easily accommodate bolts or other fasteners around its circumference without breaking apart at speed. In one embodiment, thickness T is 25 mm (1 inch).

Applicant has found good results using sixteen spokes. However, the hub according to the invention is not limited to a given number of spokes; another number may be used, as long as the hub does not break apart at speed. When using the hub in a Halbach array system, it is useful to choose the same number of spokes as the number of permanent magnets around the circumference of the rotor; so, for example, with sixteen magnets one uses sixteen spokes on the hub.

Particularly advantageous results are found when the hub is formed of the polyamideimide material sold at the time of filing under the trademark Torlon® 4203, by BP Amoco Chemical, a business of BP Amoco p.l.c. The chemical structure for this material may be found in U.S. Pat. No. 5,344,895, issued Sept. 6, 1994 to Lai et at., at Col.'s 3–4. This patent is hereby incorporated herein by reference.

When the hub is formed of this plastic, using the hub design described above, the growth rate of the hub's fastener circle has been found to match that of the spinning rotor.

The advantage of this particular material may be seen from its yield strain. This is the amount of expansion δl which a rod of the material of length l may endure before permanent set, and is expressed in inches/inch; the higher the ratio, the more stretching the material can endure before being permanently deformed. The ratio is determined by $$\in_y = \delta l / l.$$

For aluminum, this ratio is at most about 0.008 in/in; for steel, at most about 0.010 in/in; for Torlon®, it is about 0.043 in/in.

Since Torlon® has a higher value of $\in_y$ than other materials, such as aluminum and steel, it has a higher ability to grow. Thus, using this material provides significant benefits in a strain-matched hub.

Figure 4:
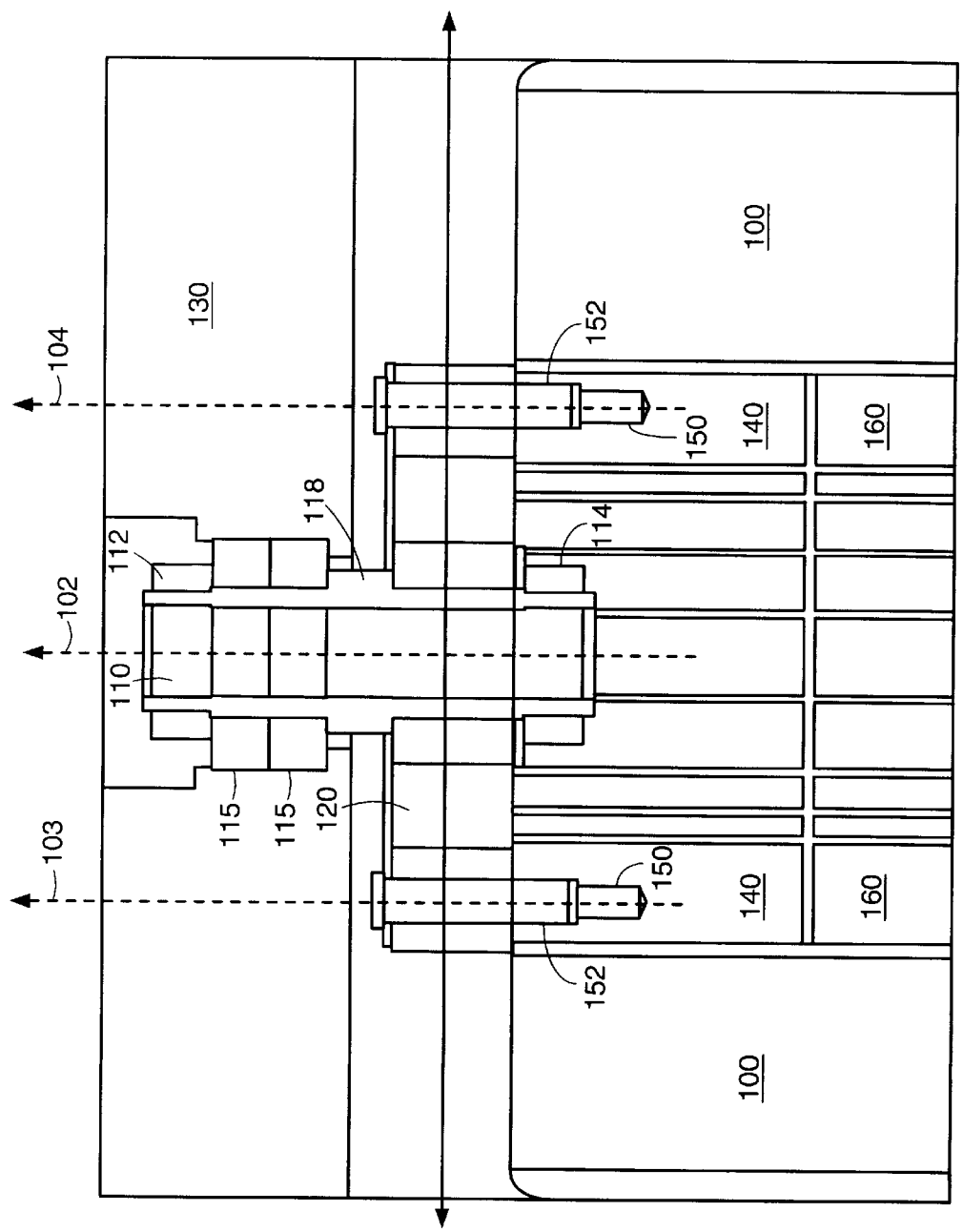
FIG. 4 shows a close-up cross-sectional view of the rotor, hub, and shaft according to the embodiment of FIG. 1.

The hub may be incorporated into a motor/generator system in the fashion shown in FIG. 4. Hub 120 connects the rotor assembly to shaft 110. Shaft 110 rotates within containment 130 in bearings 115, and is secured by outside nut 112, inside nut 114, and a thick collar portion 118. Bolts 152 extend through the fastener holes in hub 120, into keystone pieces 140, which are interference fit to rotor 100, thereby attaching hub 120 to the rotor assembly. Keystone pieces 140 rest on permanent magnets 160, which are also interference fit to rotor 100. In a preferred embodiment, keystone pieces 140 incorporate holes 150, which extend past the end of bolts 152, and may be filled with small amounts of ballast to balance the rotor.

Figure 5A:
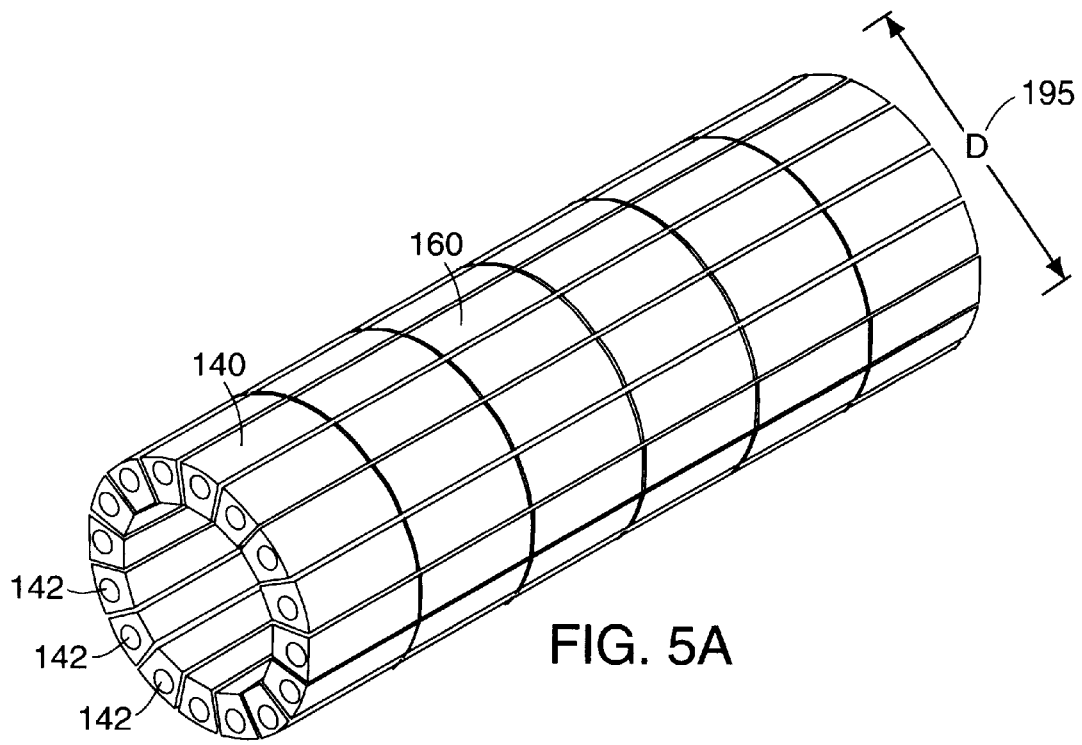
FIG. 5A shows an isometric view of keystone pieces and a permanent magnet array, according to the embodiment of FIG. 1.
Figure 5B:
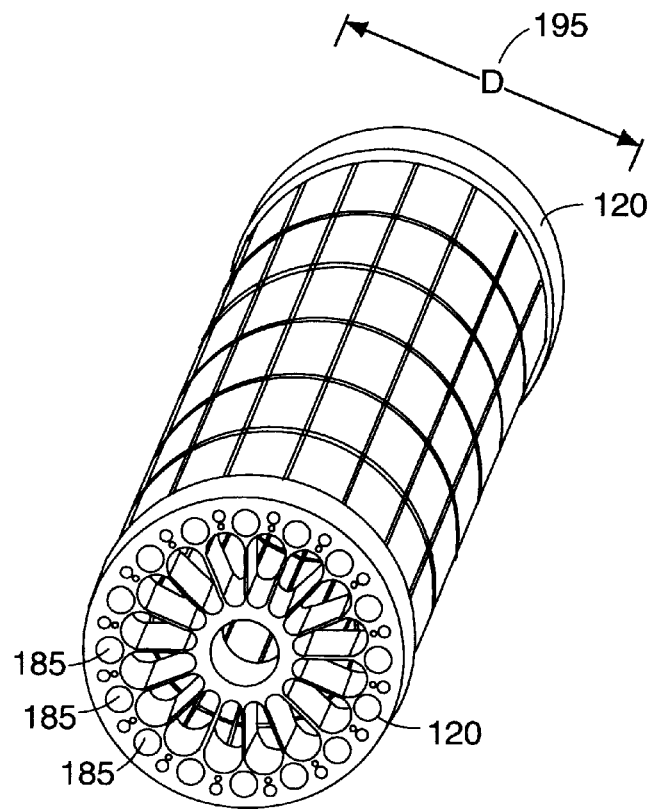
FIG. 5B shows an isometric view of a hub, keystone pieces, and a permanent magnet array, according to the embodiment of FIG. 1.

By comparing FIG. 5B with FIG. 5A one can see how hub 120 is fitted onto keystone pieces 140. Fastener holes 185 in the hub are aligned with fastener holes 142 in the keystone pieces 140, and hub 120 may have the same diameter 195 as the keystone pieces 140 and magnets 160. As shown in FIG. 5B, a system may use two hubs according to the invention— one at each axial end of the rotor.

Figure 6A:
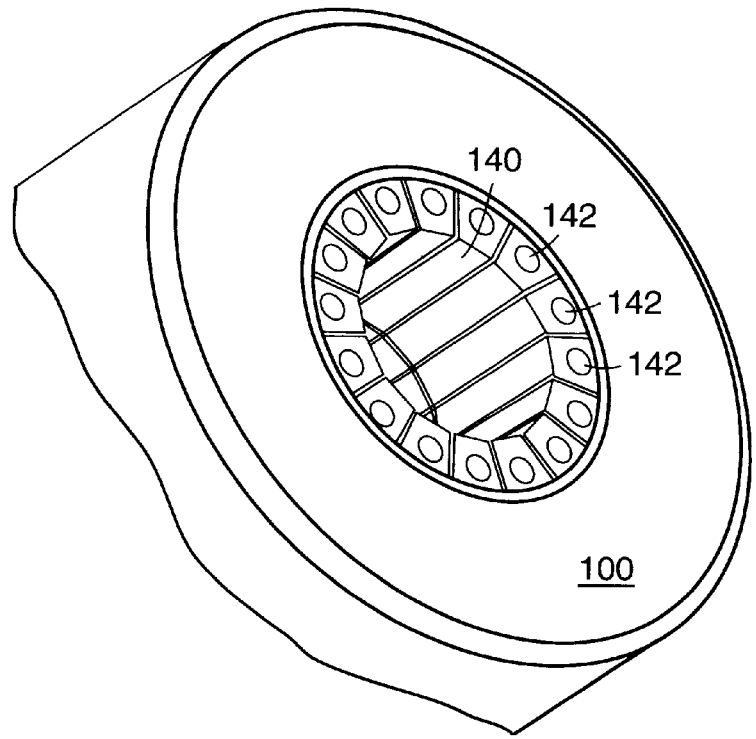
FIG. 6A shows a rotor with keystone pieces, according to the embodiment of FIG. 1.
Figure 6B:
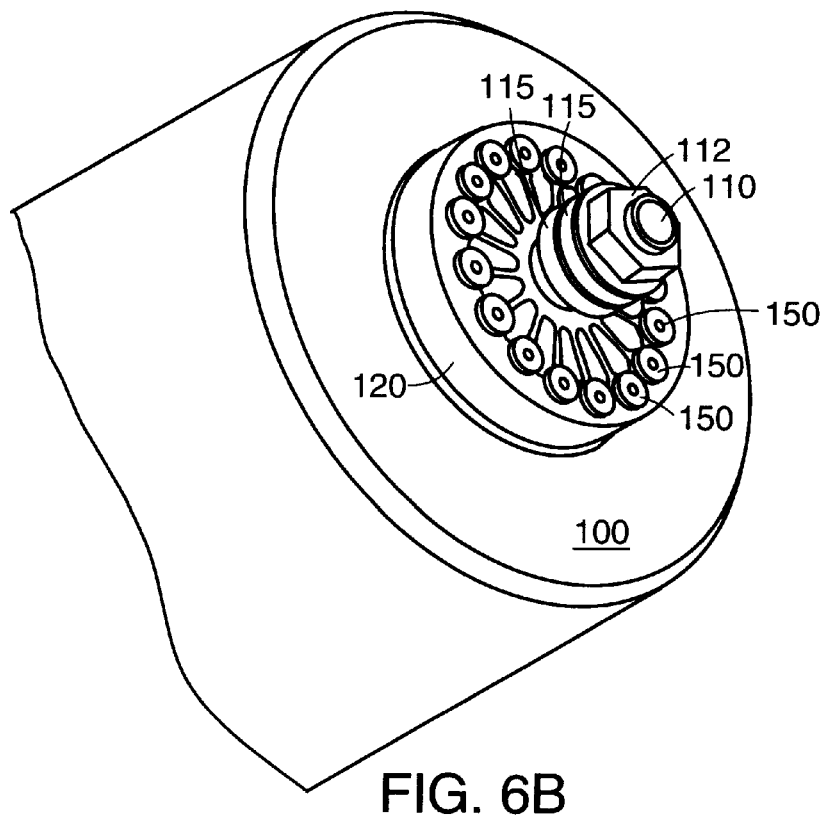
FIG. 6B shows a rotor, hub, and shaft, according to the embodiment of FIG. 1.

Similarly, FIGS. 6A and 6B also show how the hub 120 is bolted onto the keystone pieces 140, with bolts 150 going through hub 120 into fastener holes 142 in the keystone pieces 140 underneath. Shaft 110 fits into hub 120 with a tight interference fit, and rotates in bearings 115. The bearings are secured by outside nut 112.

Figure 7A:
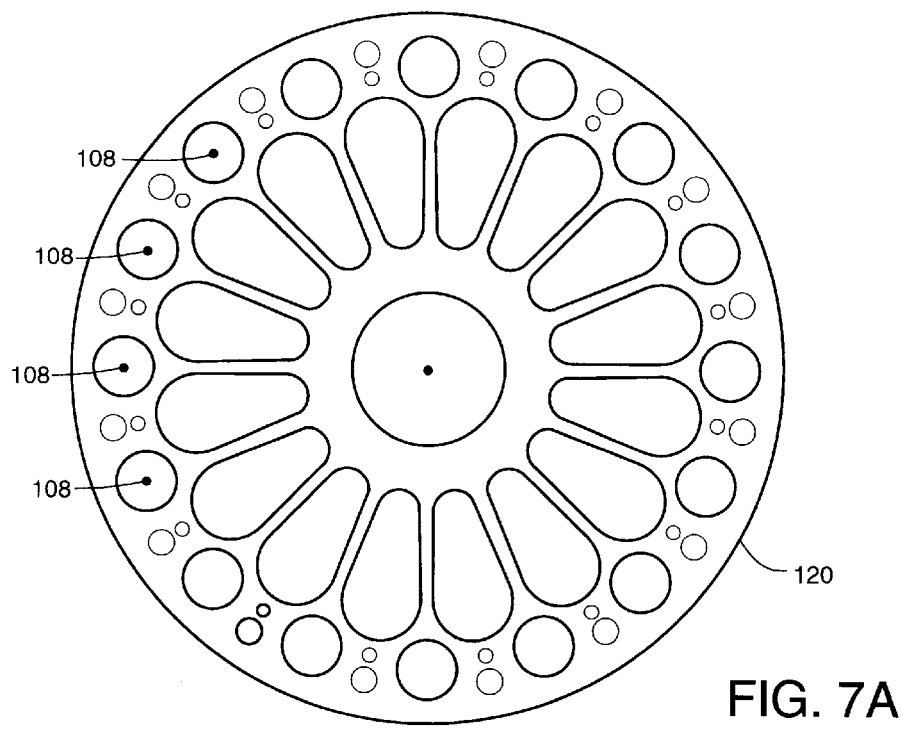
FIG. 7A shows a hub in a static state, according to the embodiment of FIG. 1.
Figure 7B:
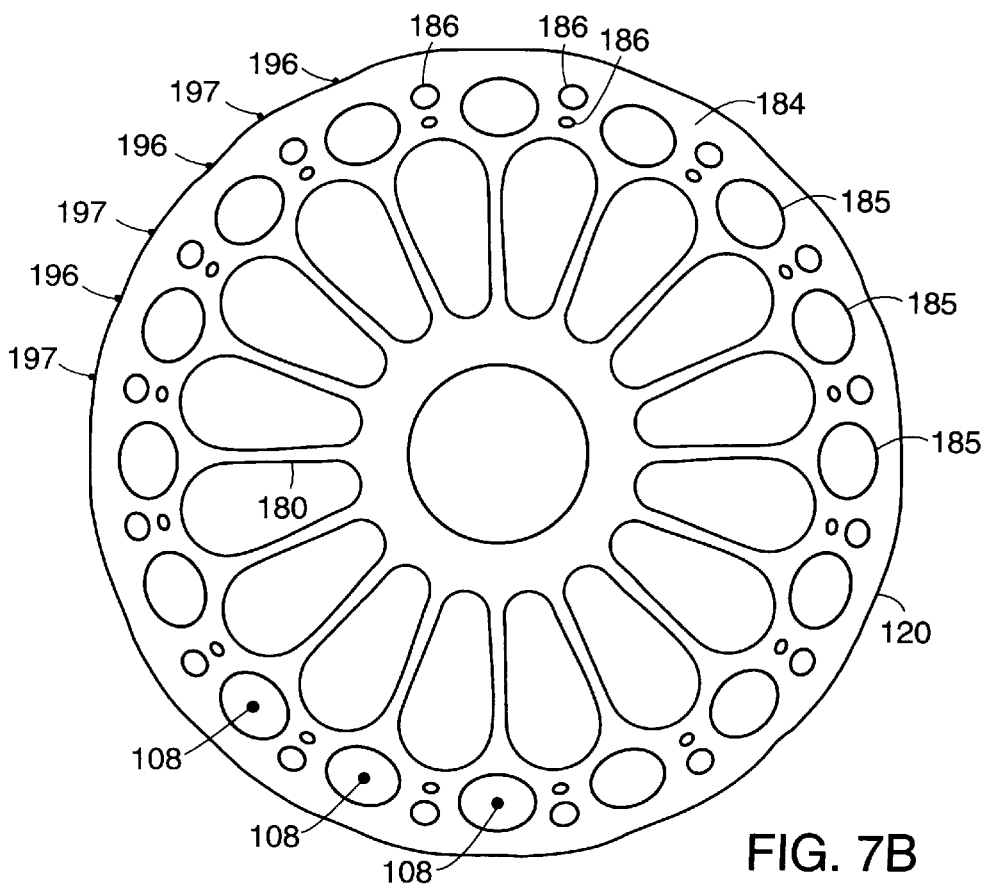
FIG. 7B shows a hub in an expanded, rotating state, according to the embodiment of FIG. 1.

By comparing FIGS. 7A and 7B one may see how hub 120 expands at high speeds; FIG. 7A shows hub 120 in a static state, while FIG. 7B shows hub 120 in an expanded, rotating state. Spokes 180 stretch, allowing the fastener circle, which passes through the centers 108 of fastener holes 185, to expand in a circumferentially uniform fashion (as will be explained below). Fastener holes 185 stretch slightly in a circumferential direction; stress-relief holes 186 ease the stress around holes 185.

By looking closely at FIG. 7B, one may observe the very slight difference in the degree of expansion of points 196, which are at points on rim 184 off the end of spokes 180, and points 197, which are at points on rim 184 between the ends of spokes 180. This effect is produced because spokes 180 provide a centripetal force, which holds regions on hub rim 184 around points 196 inwards, while restraining regions around points 197 less; the latter regions thus expand slightly further. The degree of expansion is nonetheless substantially uniform around the hub's very outer circumference, in the hub of FIG. 7B.

More importantly, however, the fastener circle, which is at a lesser radius than the very outer circumference, expands substantially uniformly around its circumference. This will be explained further with reference to FIGS. 8A through 8D.

Figure 8A:
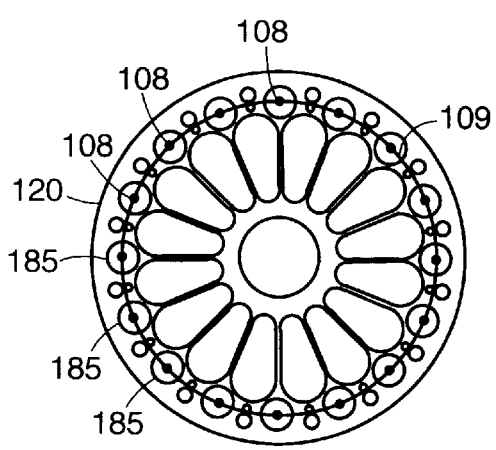
FIGS. 8A and 8C show a hub in a static state, according to the embodiment of FIG. 1.

In FIG. 8A, a fastener circle 109 is constructed by drawing an imaginary circle through centers 108 of fastener holes 185. When hub 120 of FIG. 8A rotates and expands, it assumes the shape shown in FIG. 8B. As can be seen, a circle may still be formed by connecting the centers 108 of fastener holes 185. Since such a circle can still be constructed, and is of larger radius, we say that in going from FIG. 8A to FIG. 8B, hub 120's fastener circle 109 expanded in a substantially uniform fashion around its circumference.

Note that in saying so, we are not necessarily saying that portions 111, which are hub rim portions between fastener holes 185, expand uniformly. Rather, we simply construct a new circle 109 based on the centers 108 of fastener holes 185, and say that circle 109 expanded. Thus, saying that the fastener circle expanded substantially uniformly is equivalent to saying that each center 108 moved radially outwards by the same amount.

Figure 8B:
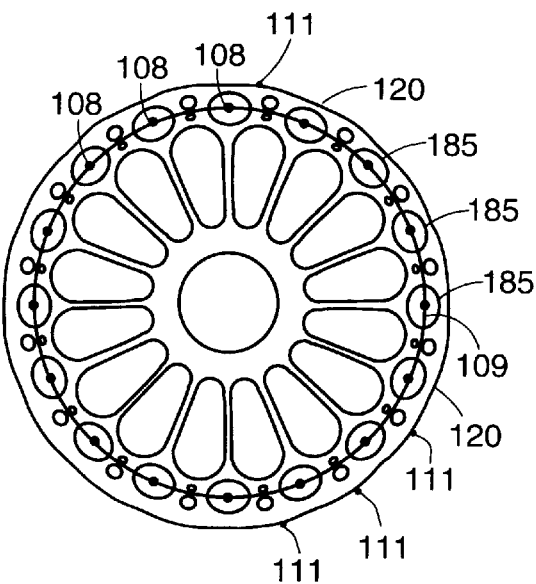
FIGS. 8B and 8D show a hub in an expanded, rotating state, according to the embodiment of FIG. 1.
Figure 8C:
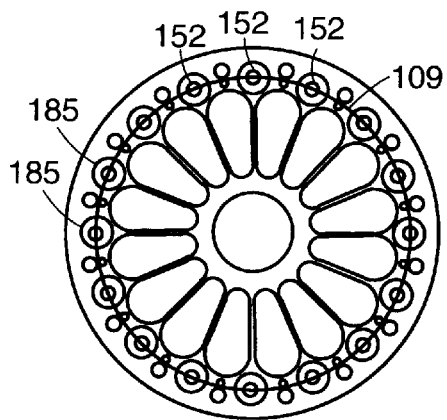
Figure 8D:
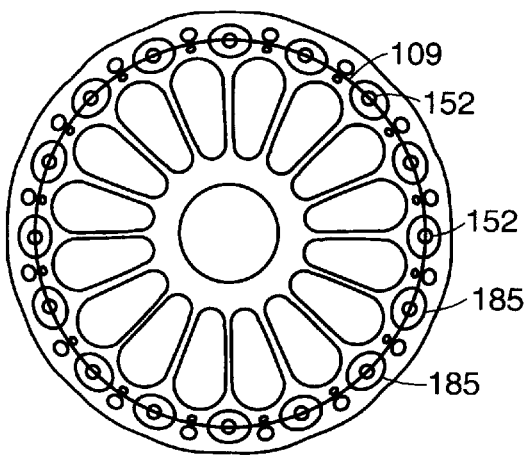

FIGS. 8C and 8D show a similar expansion to that of FIGS. 8A and 8B, except that bolts 152 are shown in fastener holes 185. In these diagrams, we see that because the fastener circle expands in a circumferentially uniform fashion, so too will bolts 152. That is, in FIGS. 8C and 8D a circle 109 is formed through the center of each bolt 152, and that circle may also be said to expand substantially uniformly around its circumference.

In a hypothetical hub with non-uniform expansion around its circumference, at least one bolt lags behind or moves ahead of the rotor's expansion, causing it to break apart.

By returning to FIG. 4, we illustrate the concept of matching the fastener circle's expansion to the rotor's expansion. Since fastener circle 109 expands substantially uniformly around its circumference, it is possible to match the fastener circle's expansion to the rotor's expansion, as shown in FIG. 4. In FIG. 4, hub 120's fastener circle has expanded to the same degree as rotor 100 has expanded. Thus, bolts 152, which pass through the fastener holes (not indicated in this figure) in hub 120 into keystone pieces 140, have remained vertical with respect to shaft axis 102. Bolt axes 103 and 104 are parallel to shaft axis 102. Hub 120 experiences no stress from bolts 152, and remains intact.

In a hypothetical failed hub, the bases of bolts 152 lag behind or move ahead of their heads, in the expansion, and axes 103 and 104 of bolts 152 are thus tilted at an angle $\alpha$ with respect to shaft axis 102. The result is that the hypothetical hub may fracture or otherwise fail, as bolts 152 attempt to tilt with respect to their fastener holes.

To avoid failing, hub 120 must be formed so that its fastener circle's expansion is matched to the rotor's expansion. An angle $\alpha$ of 0 degrees corresponds to a perfect match. Hubs according to the invention whose fastener circles expand to produce angles $\alpha$ such that the hub is stretched to a length that creates a strain ratio of $\delta l/l$ may still be considered matched to the rotor, as long as the ratio does not exceed the yield strain ratio of the material. The reason for this is that if the ratio does exceed the yield strain ratio, the hub will likely fail.

A similar angle may be invoked to describe the substantial uniformity of the fastener circle's expansion. A hub for which at least one bolt forms an angle $\alpha$ such that the hub is stretched to a length that creates a strain ratio of $\delta l/l$ may still be considered to have a substantially uniform expansion of its fastener circle, around its circumference, as long as the ratio does not exceed the yield strain ratio of the material.

Figure 9:
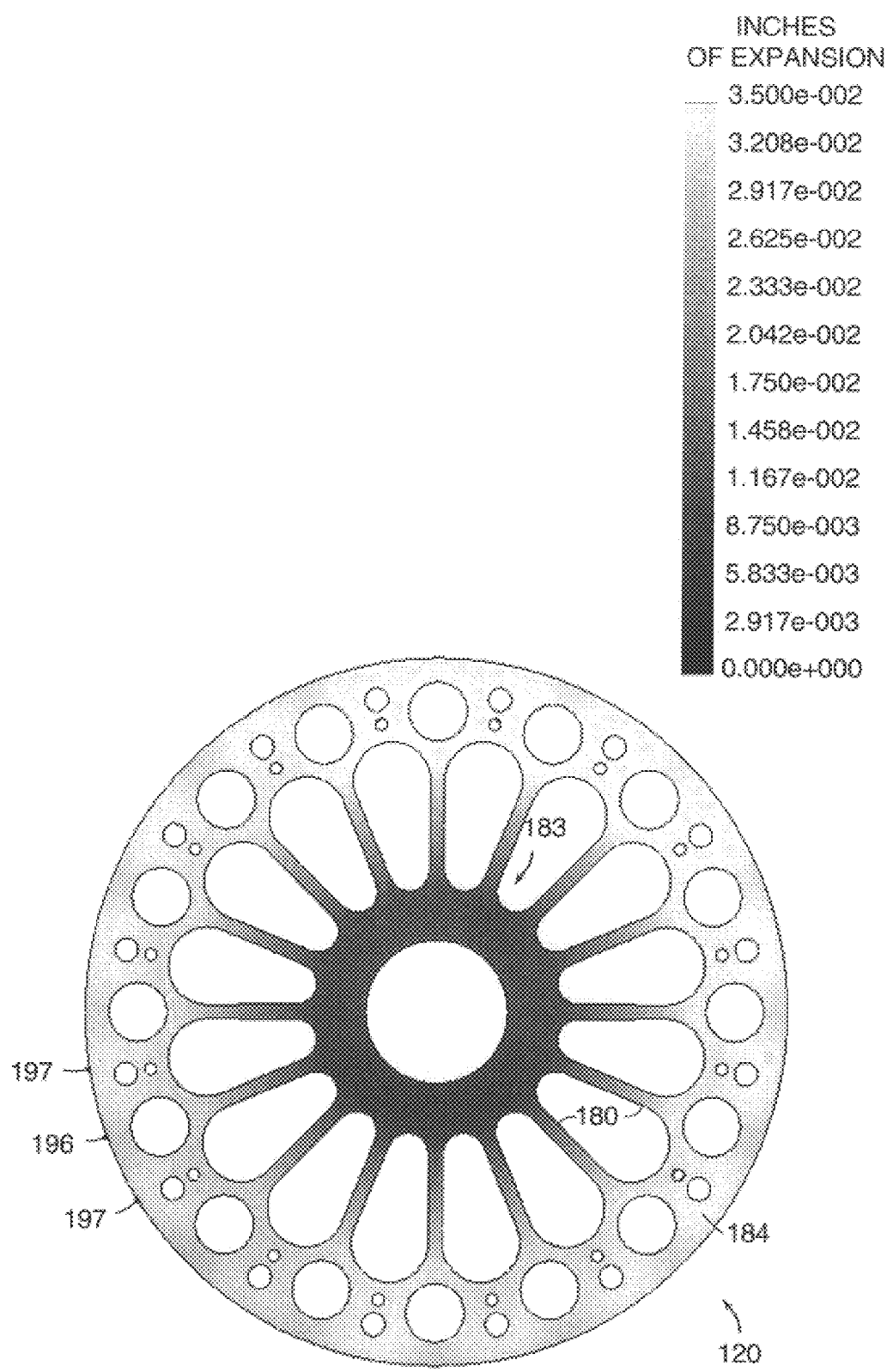
FIG. 9 shows a hub, according to the embodiment of FIG. 1, shaded to delineate expansion rates.

FIG. 9 shows a hub 120, shaded to delineate expansion rates. As can be seen, the specially-formed shape of spokes 180 allows the very outer circumference of hub rim 184 to expand at a substantially uniform rate, which is greater than that of the hub center region 183. As an example of how uniform the very outer circumference's expansion may be in accordance with the invention, one may compare the expansion of point 196, which is off the end of a spoke and undergoes the least expansion, with that of points 197, which are on the rim portion between spokes and undergo the most expansion. Using a computer model of one hub according to the invention, point 196 expanded 0.0319 inches, while points 197 expanded 0.0340 and 0.0341 inches. Taking the increased expansion of 0.0340 (the most expansion) over 0.0319 inches (the least expansion), this is an increase of 0.0021 inches, or 6.6% (measured as a percentage of the least expansion). As an absolute amount, then, actual embodiments of the invention may have growths around the very outer circumference that are uniform within 0.005 inch. By making the hub larger, however, the absolute amount of growth may vary more than this, in thousandths of an inch, while still remaining substantially uniform. Using percentage figures calculated as above (for the 6.6%, figure), other actual embodiments of the invention may allow for circumferential expansion around the very outer circumference which is substantially uniform within 10% and less, regardless of the hub's absolute size.

However, as discussed above, for the purpose of preserving hub 120 intact at high speed, it is more important that the fastener circle expand substantially uniformly around its circumference (as opposed to the hub's very outer circumference). The fastener circle's expansion is made substantially uniform by the hub's pattern of expansion shown in FIG. 9. This allows the hub to be fastened to the rotor assembly without breaking apart.

In one actual embodiment of the invention, the fastener circle is predicted to grow radially at 0.0355 inches at 44,287 rpm. Generally, the radial displacement ($\delta r$) is proportional to the square of the speed. Thus, for the actual embodiment just discussed, the formula for predicting the fastener circle growth at any speed N is:

$$\delta r = 0.0355 * (N/44,827)^2 \text{ inches.}$$

The invention is not limited to the particular speeds or expansion rates mentioned.

The invention allows for an advantageous degree of strain-matching in hubs for motor/generators, while also allowing easy access to the hub for maintenance.

In a preferred embodiment, a hub according to an embodiment of the invention is used in a Halbach array motor/ generator, such as system 18 of FIG. 1. Preferably, containment 130 is a cylindrical containment vessel. In a Halbach array system, there are stray fields outside the array of permanent magnets 160, which are not contained in surrounding iron or steel. There may therefore be eddy current losses from induced currents in the containment vessel. Since such power losses are proportional to the resistivity of the vessel's material, it is preferable to make the containment vessel from a material with a lower resistivity, such as aluminum, rather than from materials with higher resistivity, such as iron or steel. The containment should be relatively thick compared to the rotor. In one actual embodiment, the flywheel diameter is 9.65 inches, the inner containment diameter is 10 inches, and the containment thickness is 2 inches.

Figure 10:
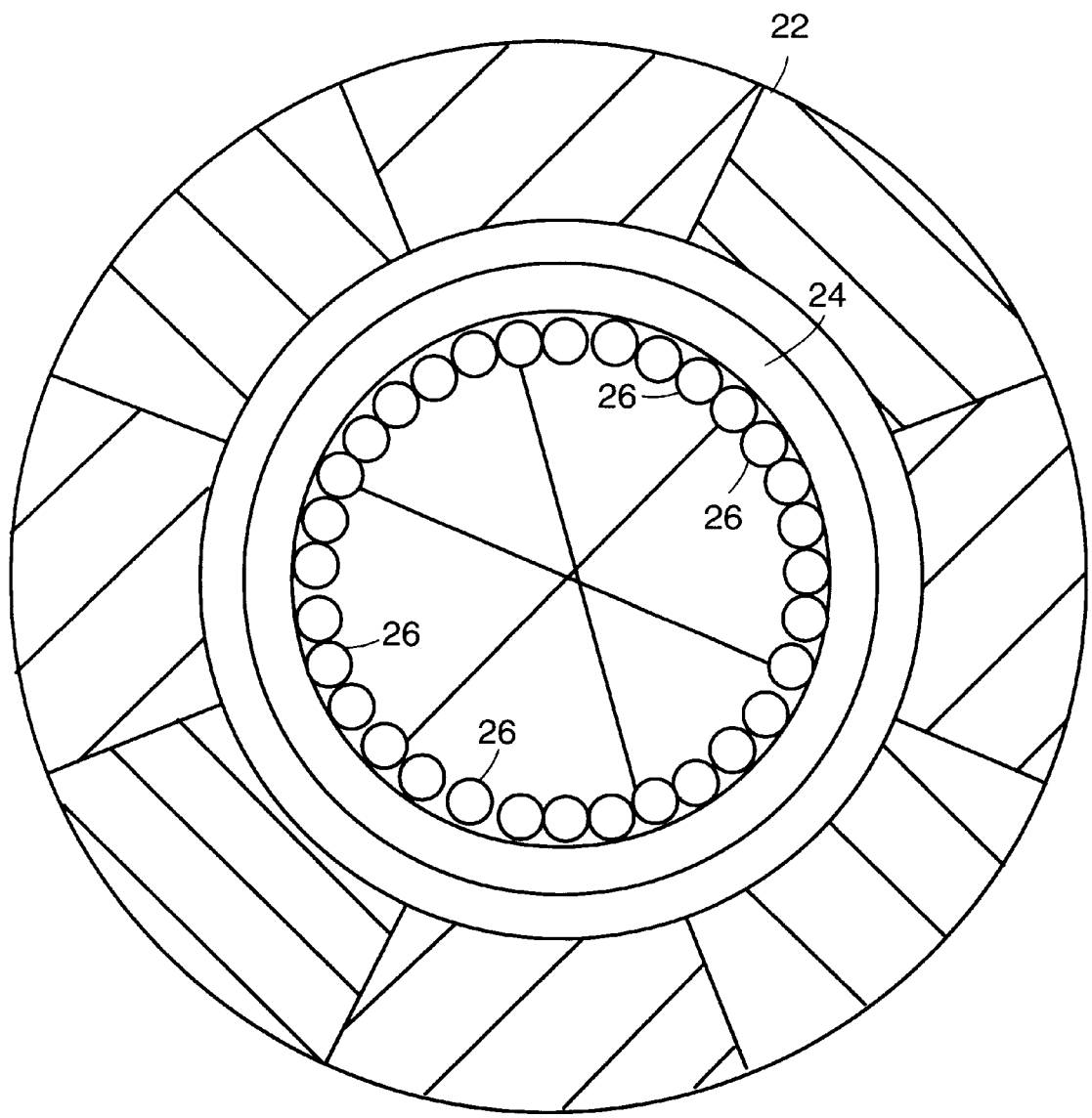
FIG. 10 shows a Halbach array with a three-phase winding in accordance with an embodiment according to the present invention.
Figure 11:
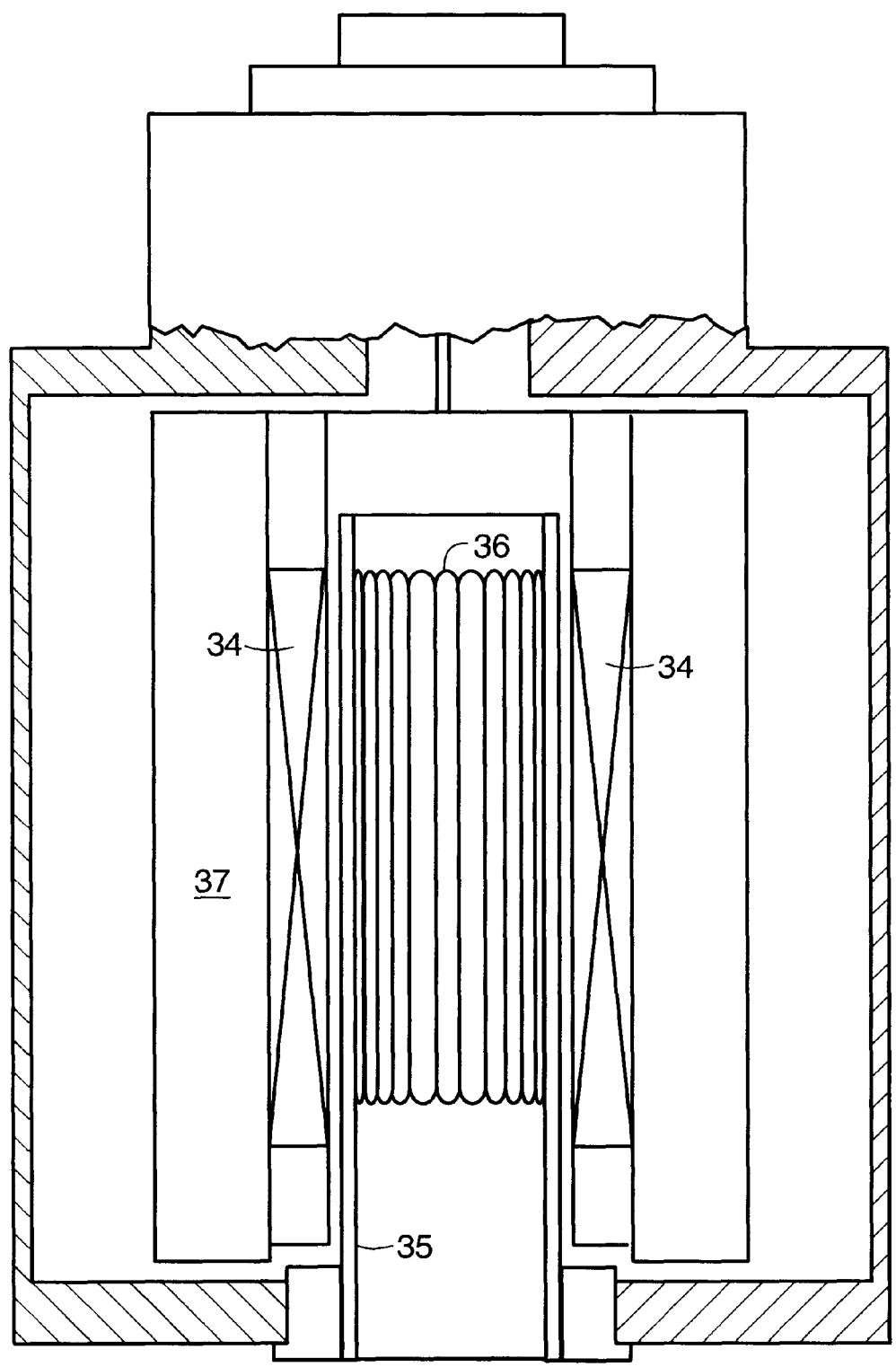
FIG. 11 shows a cross-sectional view of an electric machine in accordance with an embodiment of the present invention.
Figure 12:
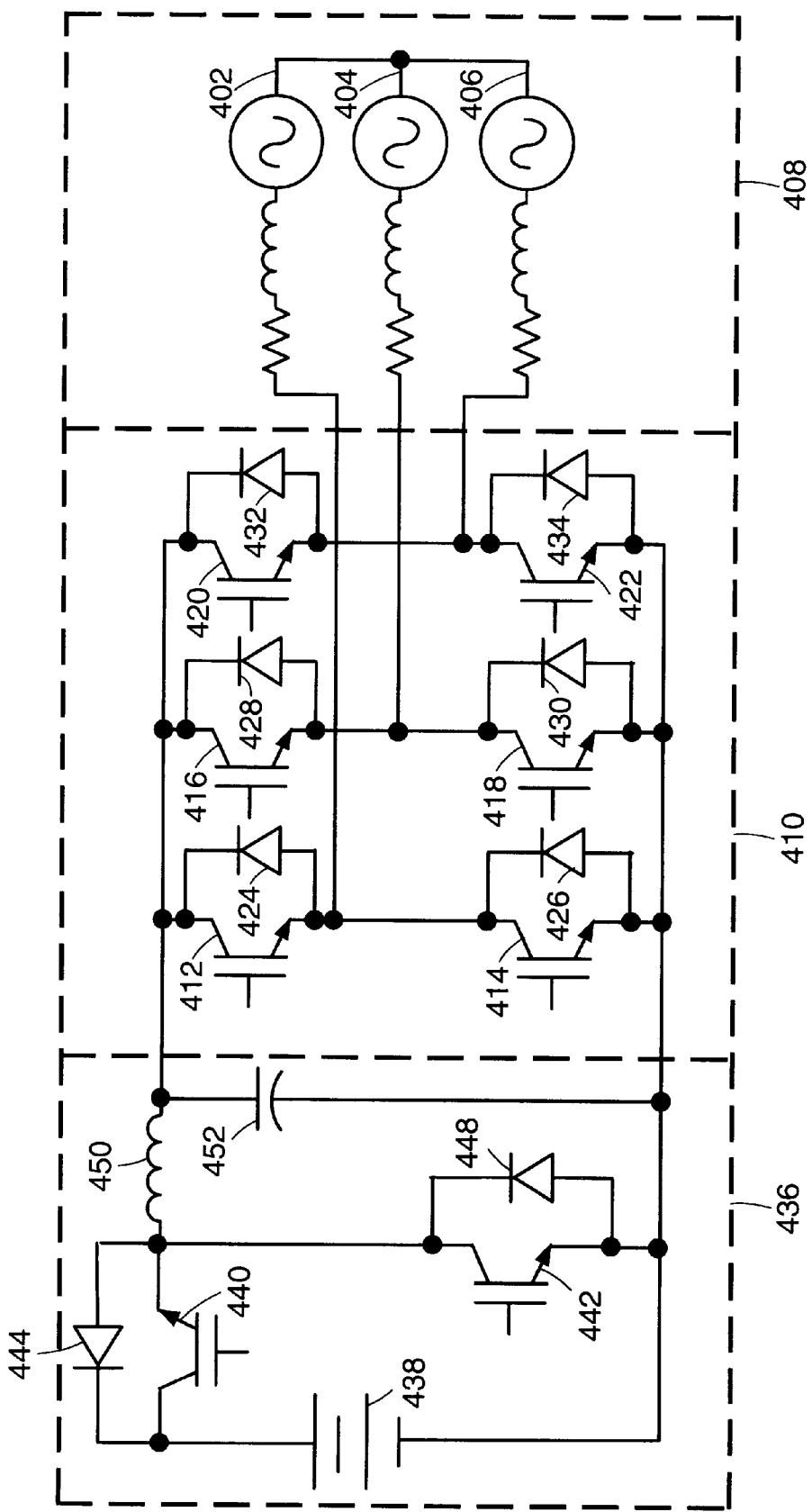
FIG. 12 shows a simplified schematic of power electronics in accordance with an embodiment according to the present invention.

FIGS. 10–12 illustrate the stator and commutator of an embodiment according to the invention. In FIG. 10, a three phase stator winding 26 is inserted into a Halbach array field. In this diagram, the Halbach array has eight magnet segments 22, a barrier 24, and a Litz wire stator winding 26. In FIG. 11, stator windings 36 are shown on a stator 35. The stator 35 is positioned inside an array of magnets 34, which is mounted inside a cylindrical rotor 37. Other arrangements than those of FIGS. 10 and 11 may be used for the stator, stator windings, and magnet segments in embodiments according to the invention, as will be appreciated by those of ordinary skill in the art.

FIG. 12 shows a simplified schematic of power electronics in accordance with an embodiment according to the present invention. The power electronics enable the Halbach array machine to function as an electronically commutated DC motor; as the voltage is raised across the motor, the speed of the motor increases. The circuit of FIG. 12 is a combined circuit that can both spin the rotor up to speed, and extract power from it, but separate circuits may be used for the two purposes. Electric commutator 410 commutates the three phases of Halbach machine 408. Buck regulator 436 provides regulated DC voltage to commutator 410.

In regulator 436, there are three parallel branches. One branch has DC voltage source 438 in series with switch 440, which has an antiparallel diode 444. Another branch has a switch 442 with an antiparallel diode 448. The third branch has a capacitor 452. Electronic commutator 410 is connected in parallel with regulator 436 and has three parallel branches. Each branch has two series connected switches (412, 414, 416, 418, 420, and 422) with antiparallel diodes (424, 426, 428, 430, 432, and 434). One phase each of three phase (402, 404, and 406) Halbach machine 408 is connected to each branch between the two series connected switches.

In accordance with embodiments of the invention, other circuits may be used than those shown as buck regulator 436, electronic commutator 410, and Halbach machine 408, as will be appreciated by those of ordinary skill in the art.

Although this description has set forth the invention with reference to several preferred embodiments, one of ordinary skill in the art will understand that one may make various modifications without departing from the spirit and the scope of the invention, as set forth in the claims.

I claim:

1. An electric machine, comprising:
   a hollow cylindrical rotor, which is part of a hollow cylindrical rotor assembly, the hollow cylindrical rotor assembly having a plurality of fastener openings; and
   a hub connecting the hollow cylindrical rotor assembly to a shaft;
   wherein the hub comprises a hub rim connected to a hub center region by a plurality of spokes, said hub rim having a plurality of fastener openings;
   and wherein an imaginary circle through the hub rim's fastener openings expands substantially uniformly around its circumference as the hub rotates.

2. An electric machine according to claim 1, in which, at any given time during rotation of the hollow cylindrical rotor assembly and the hub, a distance of radial expansion of the hub rim's imaginary circle substantially equals a distance of radial expansion of an imaginary circle through the rotor assembly's fastener openings.

3. An electric machine according to claim 2, wherein the hub is located outside the axial length of the rotor.

4. An electric machine according to claim 3, in which the hub is made of a plastic material.

5. An electric machine according to claim 4, in which the hub is made of a polyamideimide plastic.

6. An electric machine according to claim 5, further comprising a ring of keystone-shaped metal elements that are part of the rotor assembly, the hub attaching to the keystone-shaped elements with a plurality of bolts, and the keystone-shaped elements making an interference fit to the rotor.

7. An electric machine according to claim 6, in which the hub comprises a plurality of spokes, each spoke positioned along a radius from the center of the hub, and shaped to fit between two pairs of tangent-joined circles, each pair of circles including a first circle that is formed in part by the inner curve of the hub rim and a second circle that is formed in part by the outer curve of the hub's center region, the center of the first circle located radially outside the center of the second circle.

8. An electric machine according to claim 7, in which the hub is formed to include one or more stress-relief holes between adjacent bolts.

9. An electric machine according to claim 4, further comprising:
   a stator, surrounded by the rotor;
   an array of permanent magnets on the rotor that provide a uniform dipole field, such that the stator lies along the axis of the dipole field;
   windings on the stator; and
   an electric commutator which provides current to the windings;
   wherein the array of permanent magnets comprises bars of identical permanent magnets assembled in a circle, wherein the bars are dipole elements, each bar of the bars having a vector direction of magnetization that rotates at a rate which is twice that of a vector, rotating about the circle, pointing from the center of the uniform dipole field to the center of the dipole elements.

10. An electric machine according to claim 1, further comprising:
    a stator, surrounded by the rotor;
    an array of permanent magnets on the rotor that provide a uniform dipole field, such that the stator lies along the axis of the dipole field;
    windings on the stator; and
    an electric commutator which provides current to the windings.

11. An electric machine according to claim 10, wherein the array of permanent magnets comprises bars of identical permanent magnets assembled in a circle, wherein the bars are dipole elements, each bar of the bars having a vector direction of magnetization that rotates at a rate which is twice that of a vector, rotating about the circle, pointing from the center of the uniform dipole field to the center of the dipole elements.

12. An electric machine according to claim 11, wherein the electric machine is surrounded by an aluminum containment vessel.

13. A hub, comprising:

a hub center region surrounding a central hole;

a hub rim connected to said hub center region by a plurality of radially-directed spokes, said rim including openings for receiving fasteners;

the hub having the quality that a fastener circle formed by the openings expands, under high speed rotation about a shaft extending through the central hole, substantially uniformly around the fastener circle's circumference.

14. A hub according to claim 13, in which the hub is made of a plastic material.

15. A hub according to claim 14, in which the hub is made of a polyamideimide plastic.

16. A hub according to claim 15, the hub comprising a plurality of spokes, each spoke positioned along a radius from the center of the hub, and shaped to fit between two pairs of tangent-joined circles, each pair of circles including a first circle that is formed in part by the inner curve of the hub rim and a second circle that is formed in part by the outer curve of the hub's center region, the center of the first circle located radially outside the center of the second circle.

17. A hub according to claim 16, in which the hub is formed to include one or more stress-relief holes.

* * * * *